(12) United States Patent
Chung et al.

(10) Patent No.: US 10,497,176 B2
(45) Date of Patent: Dec. 3, 2019

(54) PACKING STRUCTURE

(71) Applicant: Acer Incorporated, New Taipei (TW)

(72) Inventors: Shu-Hsien Chung, New Taipei (TW);
Jhih-Hsien Wu, New Taipei (TW);
Chung-Hsien Lee, New Taipei (TW);
Ming-Haw Wang, New Taipei (TW)

(73) Assignee: Acer Incorporated, New Taipei (TW)

( * ) Notice: Subject to any disclaimer, the term of this patent is extended or adjusted under 35 U.S.C. 154(b) by 60 days.

(21) Appl. No.: 15/483,570

(22) Filed: Apr. 10, 2017

(65) Prior Publication Data
US 2017/0372520 A1    Dec. 28, 2017

(30) Foreign Application Priority Data

Jun. 28, 2016 (TW) .............................. 105120381 A

(51) Int. Cl.
| G06T 19/00 | (2011.01) |
|---|---|
| G06F 3/041 | (2006.01) |
| G02B 27/02 | (2006.01) |
| G02B 27/01 | (2006.01) |

(52) U.S. Cl.
CPC ........ *G06T 19/006* (2013.01); *G02B 27/0172* (2013.01); *G02B 27/0176* (2013.01); *G02B 27/027* (2013.01); *G06F 3/041* (2013.01); *G02B 2027/0136* (2013.01); *G02B 2027/0161* (2013.01)

(58) Field of Classification Search
CPC ................................................ G02B 27/0172
See application file for complete search history.

(56) References Cited

U.S. PATENT DOCUMENTS

| 4,961,085 A | 10/1990 | Cho et al. | |
|---|---|---|---|
| 2010/0079356 A1* | 4/2010 | Hoellwarth | .......... G02B 27/017 345/8 |
| 2015/0215608 A1* | 7/2015 | Tahara | ................ H04N 13/044 348/51 |

(Continued)

FOREIGN PATENT DOCUMENTS

| CN | 204871873 | 12/2015 |
|---|---|---|
| CN | 205186931 | 4/2016 |

(Continued)

OTHER PUBLICATIONS

Hart, Brian, "Updated Google Cardboard features actual button", May 28, 2015, Youtube. https://www.youtube.com/watch?v=PcE6sknpYio.*

(Continued)

*Primary Examiner* — Matthew Yeung
(74) *Attorney, Agent, or Firm* — JCIPRNET

(57) ABSTRACT

A packing structure including a first packing casing, a second packing casing, and two lenses is provided. The second packing casing is adapted to be combined with the first packing casing detachably, such that a containing space is formed between the first packing casing and the second packing casing. The containing space is adapted to contain an electronic device. The two lenses are disposed on the second packing casing. An image displayed by a display surface of the electronic device is adapted to be transmitted to outside of the containing space through the two lenses, so as to form a virtual reality image.

10 Claims, 5 Drawing Sheets

(56) References Cited

U.S. PATENT DOCUMENTS

2016/0349836 A1* 12/2016 Goossens .............. G06F 3/011
2017/0031164 A1*  2/2017 Costa ................... G02B 27/22

FOREIGN PATENT DOCUMENTS

| JP | H07-244246 | 9/1995 |
|---|---|---|
| TW | M415326 | 11/2011 |
| WO | 2015138266 | 9/2015 |

OTHER PUBLICATIONS

Google VR, "Get your Cardboard," Retrieved on Apr. 7, 2017, with partial English translation thereof, Available at: https://www.google.com/get/cardboard/get-cardboard/.

Alex Todd, "Recombu's virtual reality goggles beat Google Cardboard to the punch by five years," Jun. 26, 2014, Available at: https://recombu.com/mobile/article/recombu-vr-goggles-vs-google-cardboard_M20570.html.

* cited by examiner

PACKING STRUCTURE

CROSS-REFERENCE TO RELATED APPLICATION

This application claims the priority benefit of Taiwan application serial no. 105120381, filed on Jun. 28, 2016. The entirety of the above-mentioned patent application is hereby incorporated by reference herein and made a part of this specification.

FIELD OF THE INVENTION

The invention relates to a packing structure. More particularly, the invention relates to a packing structure with virtual reality image function.

DESCRIPTION OF RELATED ART

Portable display devices, such as smart phones and tablet PCs, have received significant popularity in the general consumer market. Most of the portable display devices are wrapped with paper packages when sold. Nevertheless, the paper packages provide only wrapping and product-shipping functions. In other words, the paper packages have relatively lower added values and functional benefits and thereby are thrown away easily by consumers. It thus can be observed that the paper packages fail to be in line with the concept of environmental protection.

Moreover, along with advances in display technology and increasing desire for high-tech products from consumers, the portable display devices no longer satisfy consumers' needs for visual entertainment. The virtual reality (VR) display technology thus gradually becomes mature and popular. Head mounted displays (HMDs) and video glasses are the two devices configured to realize the technology. Nevertheless, consumers have to spend extra money to purchase the VR display devices in order to experience visual entertainment effects.

SUMMARY OF THE INVENTION

The invention provides a packing structure for delivering wrapping, product-shipping, and virtual reality (VR) image functions.

In an embodiment of the invention, a packing structure includes a first packing casing, a second packing casing, and two lenses. The second packing casing is adapted to be combined with the first packing casing detachably, such that a containing space is formed between the first packing casing and the second packing casing. The containing space is adapted to contain an electronic device. The two lenses are disposed on the second packing casing. An image displayed by a display surface of the electronic device is adapted to be transmitted to outside of the containing space through the two lenses, so as to form a VR image.

In view of the foregoing, in the packing structure provided by the embodiments of the invention, the first packing casing and the second packing casing may be combined to contain the electronic device. Moreover, two lenses are disposed on the second packing casing, and the two lenses are configured to work with the image displayed by the electronic device in the packing structure so as to provide VR images for a user. Thus, after purchasing the electronic device, the user is able to experience VR visual entertainment effects through the packing structure. Besides providing wrapping and product-shipping functions, the packing structure may further enhance its added values and functional benefits through VR visual entertainment effects, so as to attract consumers to make purchases and be in line with the concept of environmental protection.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
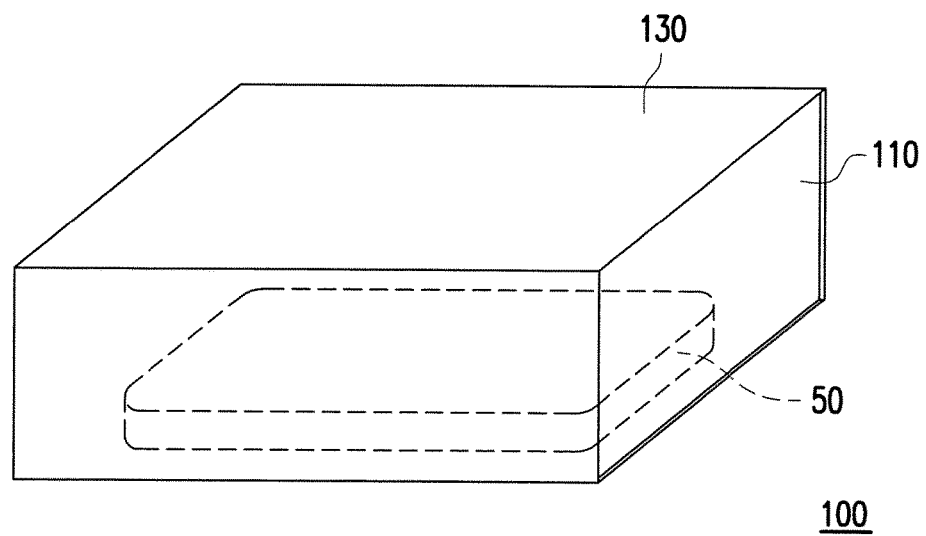
FIG. 1 is a three-dimensional view of a packing structure according to an embodiment of the invention.
Figure 2:
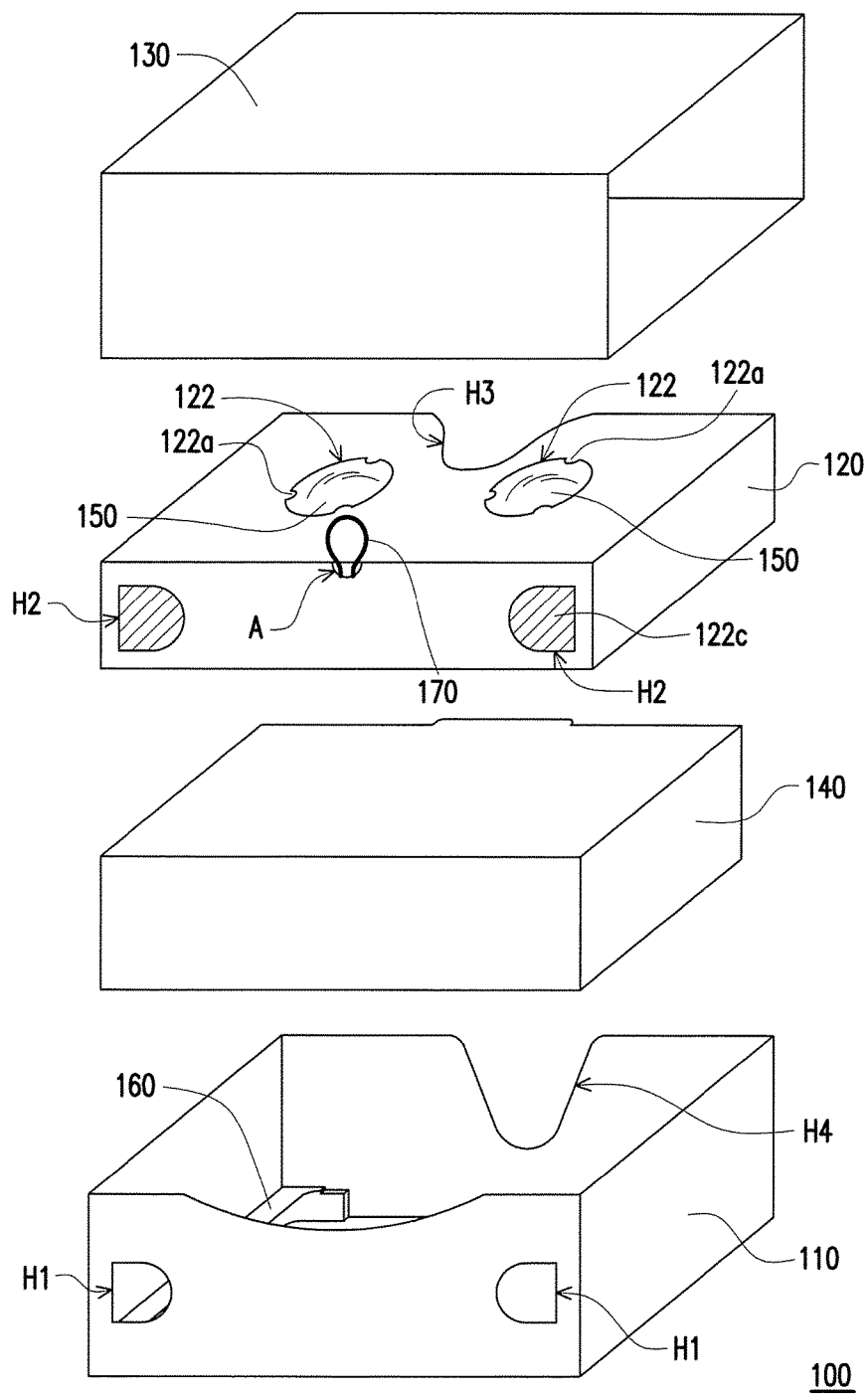
FIG. 2 is a breakdown view of the packing structure of FIG. 1.

FIG. 1 is a three-dimensional view of a packing structure according to an embodiment of the invention. FIG. 2 is a breakdown view of the packing structure of FIG. 1. Referring to FIG. 1 and FIG. 2, in the embodiment, a packing structure 100 is, for example but not limited to, a paper packing structure and includes a first packing casing 110, a second packing casing 120, a third packing casing 130, and a fourth packing casing 140 configured to be combined with one another to pack an electronic device 50. The electronic device 50 is, for example but not limited to, a smart phone.

Figure 3:
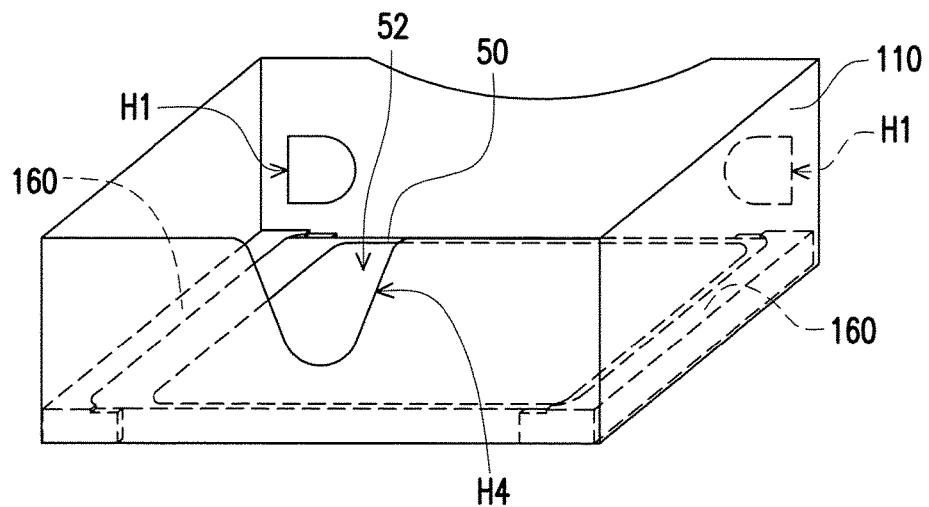
FIG. 3 to FIG. 5 are three-dimensional views of partial components of the packing structure of FIG. 1.
Figure 4:
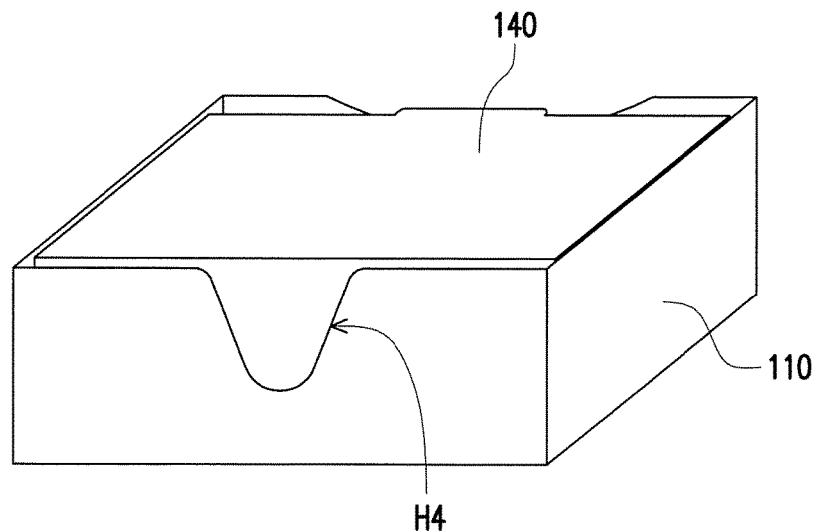
Figure 5:
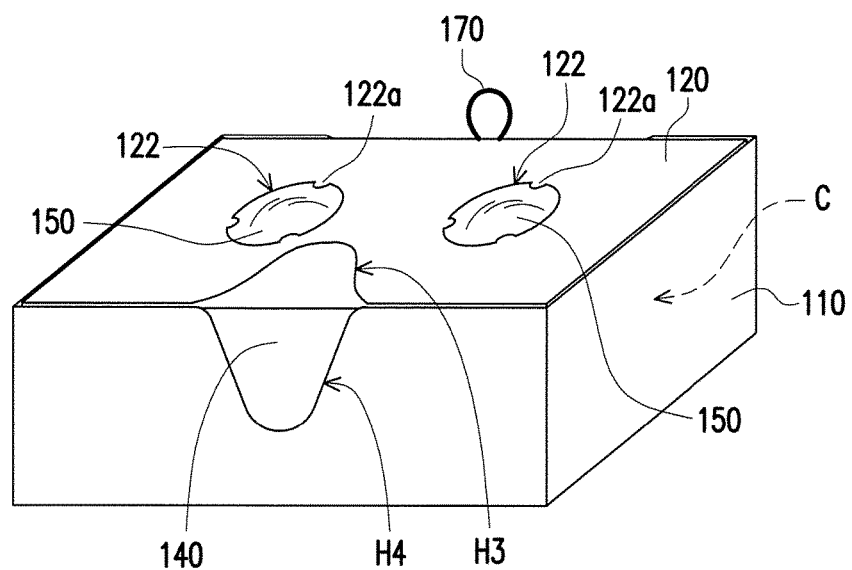

FIG. 3 to FIG. 5 are three-dimensional views of partial components of the packing structure of FIG. 1. It should be noted that view angles of FIG. 3 to FIG. 5 differ from a view angle of FIG. 2. As shown in FIG. 3, the first packing casing 100 is adapted to be loaded by the electronic device 50. The fourth packing casing 140 is, for example, configured to contain an accessory (e.g., a charger, a pair of earphones, and etc.) of the electronic device 50 and as shown in FIG. 4, adapted to be disposed on the first packing element 110 to be located above the electronic device 50. As shown in FIG. 5, the second packing casing 120 is adapted to be combined with the first packing casing 110 detachably (illustrated as the second packing casing 120 is embedded into the first packing casing 110), such that a containing space C is formed between the first packing casing 110 and the second packing casing 120. The containing space C is adapted to contain the electronic device 50 and the fourth packing casing 140. The fourth packing casing 140 is sandwiched between the electronic device 50 and the second packing casing 120.

As shown in FIG. 1, the third packing casing 130 is adapted to be fitted around the first packing casing 110 and the second packing casing 120, to cover at least a portion of the first packing casing 110 and at least a portion of the second packing casing 120 and to restrict the second packing casing 120 at the first packing casing 110. In the embodiment, the packing structure 100 shown in FIG. 1 is the packing appearance of the electronic device 50 when being sold. Information such as the appearance, model, brand name, specification, and etc. of a product may be printed on an outer surface of the third packing casing 130 to be viewed by a user.

Figure 6:
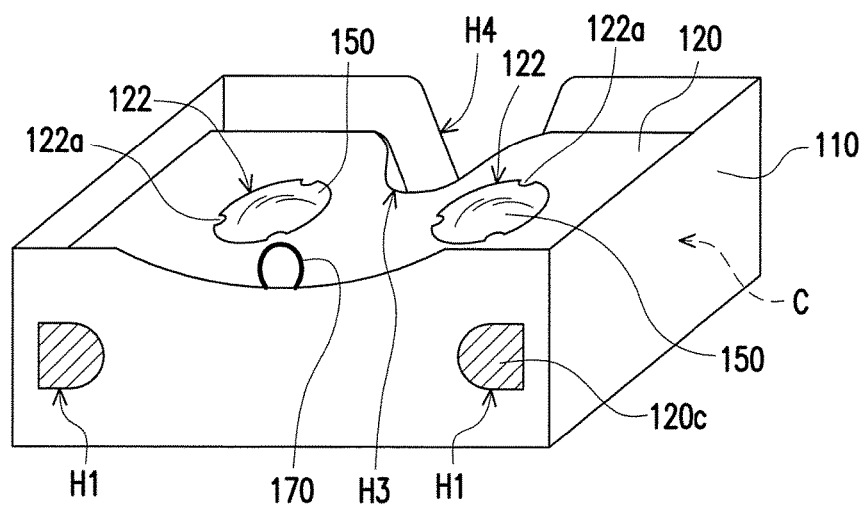
FIG. 6 illustrates a fourth packing casing of FIG. 5 is removed.

FIG. 6 illustrates a fourth packing casing of FIG. 5 is removed. It should be noted that a view angle of FIG. 6 is identical to the view angel of FIG. 2. Referring to FIG. 2, FIG. 5, and FIG. 6, the packing structure 100 further includes two lenses 150. The two lenses 150 are, for example, convex lenses and are disposed on the second packing casing 120 and configured to work with the electronic device 50 to provide image effects of virtual reality. Specifically, the fourth packing casing 140 as shown in FIG. 4 may be removed and the second packing casing 120 may be placed in the first packing casing 110 by the user, such as a state shown in FIG. 6. Meanwhile, the fourth packing casing 140 is no longer exist, such that, compared to a state shown in FIG. 5, the second packing casing 120 as shown in FIG. 6, for example, further sinks into the first packing casing 110, and that the containing space C is reduced. But the invention is not limited thereto.

Under a state shown in FIG. 6, the two lenses 150 on the second packing casing 120 correspond to the electronic device 50 in the containing space C (shown in FIG. 3). The first packing casing 110 shown in FIG. 6 may be held by the user, such that the first packing casing 110 along with the second packing casing 120 and the electronic device 50 therein are adjacent to the user's eyes. Moreover, the two lenses 150 are positioned on the user's eyes. An image displayed by a display surface 52 of the electronic device 50 may be transmitted to outside of the containing space C through the two lenses 150, so as to form a virtual reality (VR) image on the user's eyes. The VR image is generated by a displayed image created by lenses along with a display device. Such optical effect is a conventional technique in the art and thus is not repeated hereinafter.

According to such disposition, after purchasing the electronic device 50, the user is able to experience VR visual entertainment effects through the packing structure 100. Besides providing wrapping and product-shipping functions, the packing structure 100 may further enhance its added values and functional benefits through VR visual entertainment effect, so as to attract consumers to make purchases and be in line with the concept of environmental protection.

Referring to FIG. 2, FIG. 5, and FIG. 6, the second packing casing 120 provided by the embodiment has two opening holes 122. An inner edge of each of the two opening holes 122 has a plurality of protruding portions 122a, and the protruding portions 122a are configured to restrict the two lenses 150 respectively within the two opening holes 122. It should be noted that owing to different view angles, only the protruding portions 122a located at an outer surface of the second packing casing 120 are illustrated in FIG. 2, FIG. 5, and FIG. 6. The inner edge of each of the opening holes 122 also has the protruding portions 122a (shown in FIG. 7) located at an inner surface of the second packing casing 120. Such that the lenses 150 are securely sandwiched through the protruding portions 122a at the outer surface and the protruding portions 122a at the inner surface. In other embodiments, each of the lenses 150 may be slidably disposed on the second packing casing 120. As such, a distance between the two lenses 150 may be adjusted according to distances between eyes among different users.

Referring to FIG. 2 and FIG. 3, the packing structure 100 provided by the embodiment further includes at least one elastic location element 160 (two are illustrated in FIG. 3). The elastic location element 160 is disposed on the first packing casing 110 and located in the containing space C (shown in FIG. 5 and FIG. 6). A material of the elastic location element 160 is, for example, foam or other suitable elastic materials. The elastic location element 160 is configured to position the electronic device 50. Specifically, shown in FIG. 3, the two elastic location elements 160 may respectively abut against opposite ends of the electronic device 50. A portion of each of the elastic location elements 160 may further extend onto the electronic device 50, such that the electronic device 50 is securely pressed and located in the first packing casing 110.

Figure 7:
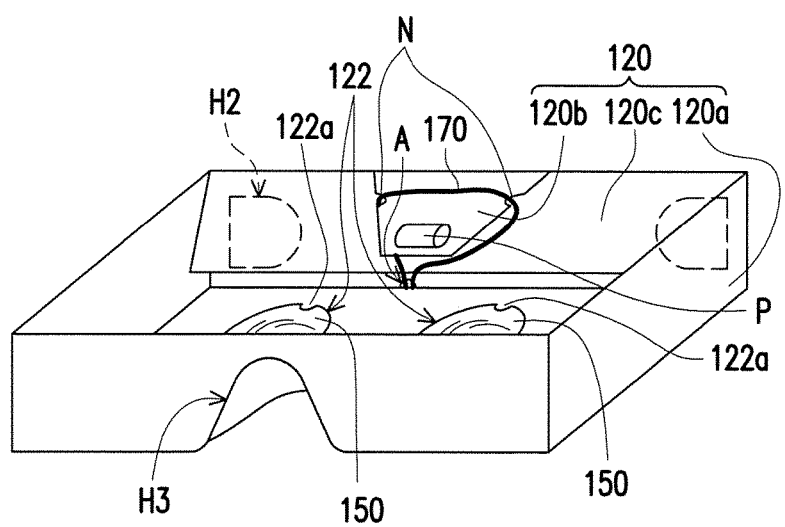
FIG. 7 is a three-dimensional view of a second packing casing of FIG. 2 from another view angle.

In the embodiment, VR visual effects are, for example, applied to interactive games executed by the electronic device 50. The user is able to perform a touch operation on the electronic device 50 when playing games, which will be described in detail below. FIG. 7 is a three-dimensional view of a second packing casing of FIG. 2 from another view angle. Referring to FIG. 7, the second packing casing 120 provided by the embodiment includes a main body 120a, a touch portion 120b, and a linkage portion 120c. The touch portion 120b and the linkage portion 120c are connected to each other and bendably connected to the main body 120a. Under the state shown in FIG. 6, the touch portion 120b is adapted to be bent into the containing space C (shown in FIG. 6) as shown in FIG. 7. The linkage portion 120c is adapted to be forced to drive the touch portion 120b. Thus, the touch portion 120b is bent and a display surface 52 of the electronic device 50 is pressed by a touch protruding portion P (shown in FIG. 3), and that a touch operation is performed on the display surface 52.

Furthermore, as shown in FIG. 2 and FIG. 6, the first packing casing 110 of the packing structure 100 has at least one opening H1 (two are illustrated), and as shown in FIG. 2, the second packing casing 120 of the packing structure 100 has at least one opening H2 (two are illustrated). Under the state shown in FIG. 6, the opening H1 and the opening H2 overlap and expose the linkage portion 120e. Such that the linkage portion 120c may be forced through the opening H1 and the opening H2 so as to drive the touch portion 120b to press the display surface 52 of the electronic device 50. In the embodiment, a material of the touch portion 120b and the linkage portion 120c includes, for example, a conductive material. Thereby, the user is able to perform the touch operation smoothly through the touch portion 120b and the linkage portion 120c.

Besides, as shown in FIG. 7, the packing structure may further include an elastic connection element 170. The elastic connection element 170 is, for example but not limited to, an elastic rubber band. The elastic connection element 170 is connected to the main body 120a of the second packing casing 120 and is adapted to be connected to the touch portion 120b of the second packing casing 120 detachably. Thus, the touch portion 120b is able to return to a position away from the display surface 52 of the electronic device 50 (illustrated in FIG. 3) through an elastic force of the elastic connection element 170. Thereby, the touch portion 120b is prevented from not being able to rebound automatically and failing to smoothly perform following touch operations after pressing the display surface 52. Specifically, in the embodiment, the main body 120a has a hole A, and the touch portion 120b has at least one recess N (two are illustrated). An end of the elastic connection element 170 is connected to the main body 120a through the hole A. When the user intends to experience RV and performs a touch operation, the other end of the elastic connection element 170 may be fitted around the touch portion 120b detachably through the recess N, and that the connection between the touch portion 120b and the elastic connection element 170 is completed. In addition, a portion of the elastic connection element 170 located outside of the hole A (i.e., the portion indicated by the reference number 170 in FIG. 6) may further be wound around outside of the main body 120a and fitted around the recess N from an upper edge of the touch portion 120b in FIG. 7, so as to install the elastic connection element 170 more securely. In other words, the two ends of the elastic connection element 170 are fitted around the recess N respectively from an upper side and a bottom side of the touch portion 120b. In other embodiments, the elastic connection element 170 may be connected between the main body 120a and the touch portion 120b through other suitable methods. The invention is not limited thereto.

Referring to FIG. 6, in the embodiment, the second packing casing 120 has a space-allowing hole H3, and the first packing casing 110 has a space-allowing recess portion H4 corresponding to space-allowing hole H3. The space-allowing hole H3 and the space-allowing recess portion H4 are used to create a space for the nose of the user, so as to facilitate the VR operation.

To sum up, in the packing structure provided by the embodiments of the invention, the first packing casing and the second packing casing may be combined to contain the electronic device. Moreover, two lenses are disposed on the second packing casing, and the two lenses are configured to work with the image displayed by the electronic device in the packing structure so as to provide VR images for the user. As such, after purchasing the electronic device, the user is able to experience VR visual entertainment effects through the packing structure. Besides providing wrapping and product-shipping functions, the packing structure may further enhance its added values and functional benefits through VR visual entertainment effects, so as to attract consumers to make purchases and be in line with the concept of environmental protection.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A packing structure, comprising:
   a first packing casing;
   a second packing casing, adapted to be combined with the first packing casing detachably, such that a containing space is formed between the first packing casing and the second packing casing, wherein the containing space is adapted to contain an electronic device;
   at least one location element, disposed on the first packing casing and located outside the second packing casing, wherein the at least one location element is adapted to position the electronic device, and the at least one location element comprises two location elements separated from each other,
   wherein each of the two location elements comprises a concave portion, and the concave portions are facing each other for positioning the electronic device therebetween,
   wherein the electronic device comprises a display surface and two longitudinal-side surfaces, the two longitudinal-side surfaces are respectively perpendicular to the display surface and opposite to each other,
   wherein two gaps are respectively formed between the two location elements, the electronic device, and the first packing casing and extend along the longitudinal-side surfaces, the two gaps respectively expose a portion of each of the two longitudinal-side surfaces; and
   two lenses, disposed on the second packing casing, wherein an image displayed by the display surface of the electronic device is adapted to be transmitted to outside of the containing space through the two lenses, so as to form a virtual reality image.

2. The packing structure as claimed in claim 1, comprising a third packing casing, wherein the third packing casing is adapted to be fitted around the first packing casing and the second packing casing, to cover at least a portion of the first packing casing and at least a portion of the second packing casing and to restrict the second packing casing at the first packing casing.

3. The packing structure as claimed in claim 1, comprising a fourth packing casing, wherein at least one accessory of the electronic device is adapted to be contained in the fourth packing casing, and the fourth packing casing is adapted to be contained in the containing space and sandwiched between the electronic device and the second packing casing.

4. The packing structure as claimed in claim 1, wherein the second packing casing has two opening holes, an inner edge of each of the two opening holes has a plurality of protruding portions, and the protruding portions restrict the two lenses respectively within the two opening holes.

5. The packing structure as claimed in claim 1, wherein the second packing casing comprises a main body and a touch portion, the touch portion is bendably connected to the main body and is adapted to be bent into the containing space, and the touch portion is adapted to be forced to press the display surface for performing a touch operation on the display surface.

6. The packing structure as claimed in claim 5, having at least one opening, wherein the second packing casing has a linkage portion, the at least one opening exposes the linkage portion, the linkage portion is connected to the touch portion, and the linkage portion is adapted to be forced through the at least one opening to drive the touch portion to press the display surface.

7. The packing structure as claimed in claim 6, wherein a material of the touch portion and the linkage portion comprises a conductive material.

8. The packing structure as claimed in claim 5, comprising an elastic connection element, wherein the elastic connection element is connected to the main body and is adapted to be detachably connected to the touch portion, and the touch portion is adapted to return to a position away from the display surface through an elastic force of the elastic connection element.

9. The packing structure as claimed in claim 8, wherein the main body has a hole, the touch portion has at least one recess, an end of the elastic connection element is connected to the main body through the hole, and the other end of the elastic connection element is detachably fitted around the touch portion through the at least one recess.

10. The packing structure as claimed in claim 1, wherein the at least one location element is at least one elastic location element is adapted to position the electronic device.

* * * * *